United States Patent
Pajukoski et al.

(10) Patent No.: US 9,706,533 B2
(45) Date of Patent: Jul. 11, 2017

(54) METHOD AND APPARATUS FOR TRANSMITTING A REFERENCE SIGNAL IN A COMMUNICATION SYSTEM

(75) Inventors: Kari Pekka Pajukoski, Oulu (FI); Kari Juhani Hooli, Oulu (FI); Esa Tapani Tiirola, Kempele (FI); Pasi Eino Tapio Kinnunen, Oulu (FI); Mauri Johannes Nissila, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 173 days.

(21) Appl. No.: 14/377,360

(22) PCT Filed: Feb. 10, 2012

(86) PCT No.: PCT/EP2012/052250
§ 371 (c)(1),
(2), (4) Date: Aug. 22, 2014

(87) PCT Pub. No.: WO2013/117231
PCT Pub. Date: Aug. 15, 2013

(65) Prior Publication Data
US 2015/0327244 A1 Nov. 12, 2015

(51) Int. Cl.
| | |
|---|---|
| *H04W 4/00* | (2009.01) |
| *H04W 72/04* | (2009.01) |
| *H04L 5/00* | (2006.01) |
| *H04J 11/00* | (2006.01) |
| *H04W 88/02* | (2009.01) |
| *H04W 88/08* | (2009.01) |
| *H04W 72/08* | (2009.01) |

(52) U.S. Cl.
CPC ....... *H04W 72/0413* (2013.01); *H04J 11/005* (2013.01); *H04L 5/0003* (2013.01);
(Continued)

(58) Field of Classification Search
CPC ..... H04L 5/001; H04L 5/0048; H04L 5/0003; H04L 5/0005; H04L 5/0051;
(Continued)

(56) References Cited

U.S. PATENT DOCUMENTS

| | | | | |
|---|---|---|---|---|
| 2012/0051265 A1* | 3/2012 | Shen | ...................... | H04L 5/0035 370/254 |
| 2013/0039305 A1* | 2/2013 | Kishiyama | ........ | H04W 72/1263 370/329 |

(Continued)

FOREIGN PATENT DOCUMENTS

| | | | |
|---|---|---|---|
| WO | 2009/150177 A2 | | 12/2009 |
| WO | WO 2011086920 | * | 7/2011 |

(Continued)

OTHER PUBLICATIONS

International Search Report and Written Opinion for International Application No. PCT/EP2012/052250, mailed Oct. 11, 2012, 12 pages.

(Continued)

*Primary Examiner* — Kwang B Yao
*Assistant Examiner* — Harun Chowdhury
(74) *Attorney, Agent, or Firm* — Brake Hughes Bellermann LLP (57) ABSTRACT

A method for reference signal transmission is disclosed, wherein a demodulation reference signal DMRS and a sounding reference signal SRS is transmitted in a same time domain resource from a user terminal to an LTE base station. A single reference signal sequence is used both for demodulation and detection of a data channel, and for channel sounding, such that a reference signal sequence part used for the demodulation and detection of the data channel is in a power offset compared to a reference signal sequence part used for the channel sounding. Code division multiplexing is applied on a reference signal sequence by using a cyclic shift of a whole length of the sequence. The cyclic shift is selected such that reference signal sequences allocated to the different user terminals are orthogonal over a minimum allocation granularity of the data channel.

36 Claims, 5 Drawing Sheets

(52) U.S. Cl.
CPC .......... *H04L 5/0005* (2013.01); *H04L 5/0048* (2013.01); *H04L 5/0053* (2013.01); *H04W 72/0453* (2013.01); *H04W 72/082* (2013.01); *H04W 88/02* (2013.01); *H04W 88/08* (2013.01)

(58) Field of Classification Search
CPC .... H04L 27/261; H04W 28/06; H04W 52/16; H04W 52/146; H04W 52/262; H04W 72/0413; H04W 72/1263; H04W 72/082; H04J 11/005
USPC ........ 370/252, 254, 344, 328–330, 335, 336
See application file for complete search history.

(56) References Cited

U.S. PATENT DOCUMENTS

| | | | | |
|---|---|---|---|---|
| 2013/0089044 | A1* | 4/2013 | Park | H04W 52/146 370/329 |
| 2013/0195032 | A1* | 8/2013 | Goransson | H04W 52/262 370/329 |
| 2013/0242911 | A1* | 9/2013 | Heo | H04L 5/001 370/329 |

FOREIGN PATENT DOCUMENTS

| | | | |
|---|---|---|---|
| WO | WO2011087238 | * | 7/2011 |
| WO | WO2011099613 | * | 8/2011 |
| WO | WO 2011120238 | * | 10/2011 |
| WO | 2011/155711 A2 | | 12/2011 |

OTHER PUBLICATIONS

R1-073091; Samsung; "Summary of Reflector Discussions on EUTRA UL RS"; 3GPP TSG RAN WG1 Meeting #49bis; Orlando, FL, USA, Jun. 25-29, 2007.

R1-114232; Samsung; "SRS Transmission Power Control for CoMP"; 3GPP TSG RAN WG1 #67; San Francisco, USA, Nov. 14-18, 2011.

* cited by examiner

METHOD AND APPARATUS FOR TRANSMITTING A REFERENCE SIGNAL IN A COMMUNICATION SYSTEM

This application is a national stage entry of PCT Application No. PCT/EP2012/052250, filed on Feb. 10, 2012, entitled "METHOD AND APPARATUS FOR TRANSMITTING A REFERENCE SIGNAL IN A COMMUNICATION SYSTEM", which is hereby incorporated by reference in its entirety.

FIELD OF THE INVENTION

The exemplary and non-limiting embodiments of this invention relate generally to wireless communications networks, and more particularly to reference signal multiplexing.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

LTE defines an optional sounding reference signal (SRS) feature in the uplink. The sounding reference signal (SRS) is transmitted by UE by using a known sequence, similar a UL demodulation reference signal (DMRS), so eNB may use it to estimate UL channel quality. UL information may be decoded in eNB with UL DMRS. UL DMRS is transmitted from UE to eNB together with the UL data and both locate exactly in the same resource blocks, so the channel information eNB extracts from UL DMRS is for that transmission. SRS may be located in a UL PHY frame such that it is transmitted in the last symbol of a sub-frame if scheduled. SRS is used by the base station to estimate the quality of the uplink channel for large bandwidths outside the assigned PUSCH span to a specific UE. This measurement cannot be obtained with the DMRS since these are always associated to the PUSCH or PUCCH and limited to the UE allocated PUSCH or PUCCH bandwidth. SRS may be transmitted e.g. in every second sub-frame or as infrequent as every 16th frame. SRS may be transmitted on the last symbol of the sub-frame. The channel quality estimate may be obtained within a single SC-FDMA symbol.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, and a computer program product as defined in the independent claims. Further embodiments of the invention are disclosed in the dependent claims.

An aspect of the invention relates to a method comprising transmitting, from a user terminal to a network apparatus, a demodulation reference signal DMRS and a sounding reference signal SRS in a same frequency time resource, wherein a single reference signal sequence is used both for demodulation and detection of a data channel, and for channel sounding, such that a reference signal sequence part used for the demodulation and detection of the data channel is in a power offset compared to a reference signal sequence part used for the channel sounding.

A further aspect of the invention relates to an apparatus comprising at least one processor; and at least one memory including a computer program code, wherein the at least one memory and the computer program code are configured to, with the at least one processor, cause the apparatus to transmit, to a radio network node, a demodulation reference signal DMRS and a sounding reference signal SRS in a same time domain resource, wherein a single reference signal sequence is used both for demodulation and detection of a data channel, and for channel sounding, such that a reference signal sequence part used for the demodulation and detection of the data channel is in a power offset compared to a reference signal sequence part used for the channel sounding.

A still further aspect of the invention relates to an apparatus comprising at least one processor; and at least one memory including a computer program code, wherein the at least one memory and the computer program code are configured to, with the at least one processor, cause the apparatus to receive, from a user terminal, a demodulation reference signal DMRS and a sounding reference signal SRS in a same time domain resource, wherein a single reference signal sequence is used both for demodulation and detection of a data channel, and for channel sounding, such that a reference signal sequence part used for the demodulation and detection of the data channel is in a power offset compared to a reference signal sequence part used for the channel sounding.

A still further aspect of the invention relates to a computer program product comprising program code means adapted to perform any one of the method steps when the program is run on a computer.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

An exemplary embodiment relates to an LTE-advanced system which is a part of LTE Rel-11. More specifically, an exemplary embodiment relates to sounding reference signal (SRS) enhancement. An objective of 3GPP RAN1 WI is to study the extent to which specified support is beneficial for UL COMP operation in homogenous and heterogeneous configurations. Areas for study include enhancements and requirements on uplink (UL) reference signals to improve SRS capacity and reception.

SRS may be used to provide information on uplink channel quality on a wider bandwidth than current PUSCH transmission or when terminal has no transmissions on PUSCH. There are multiple use cases for SRS in LTE/LTE-advanced: in LTE, support for channel-aware packet scheduling, support for timing control/power control, support for AMC, and support for MU-MIMO pairing; and, in LTE-advanced, component carrier aggregation, multi-cluster scheduling within one component carrier, support for PMI&RI selection (uplink SU-MIMO), support for downlink CSI estimation at multiple cells exploiting channel reciprocity, and support for collaborative pre-coder/beam selection in UL COMP.

In LTE/LTE-advanced, SRS is time multiplexed with a demodulation reference signal (DMRS) and uplink data such that one of the SC-FDMA data symbols is replaced by SRS. This results in throughput loss due to additional overhead. Further, sounding capacity is not enough for LTE-advanced features like COMP and SU-MIMO.

Unused demodulation reference signals (DMRS) resources may be used for sounding. However, such a design may result in an increased inter-cell interference on DMRS.

Capacity and overhead may create a challenge for LTE/LTE-advanced based sounding where an SRS signal is time multiplexed with data and DMRS. The inter-cell interference may create a challenge for DMRS based sounding. Pairing of DMRS-based sounding with normal DMRS may create a challenge.

Regarding the capacity aspect, the use of SRS for closed loop pre-coding and frequency domain packet scheduling (FDPS) requires that each of transmission antennas transmits SRS with a period shorter than channel coherence time and at bandwidth significantly larger than channel coherence bandwidth. This causes significant increase in SRS usage in the event that a considerable share of LTE-A terminals are SU-MIMO UEs or when large portions of UEs are selected for COMP reception (in that case, orthogonal SRS multiplexing is extended over multiple cells). On other hand, available SRS resources are limited to a single SC-FDMA symbol per sub-frame. Thus, the increased SRS usage may easily lead to a channel sounding period being forced to be increased. This limits the useful velocity range for FDPS and (short-term) closed loop pre-coding. The increased SRS usage may lead to a level of inter-cell interference being increased for SRS in synchronized networks due to CDM that is non-orthogonal between cells. This degrades the accuracy of SRS based channel sounding. In other words, performance of SRS based channel sounding may be a limiting bottleneck for widespread UL SU-MIMO or COMP usage.

The inter-cell interference challenge with DMRS based sounding refers to inter-cell interference due to non-orthogonal CDM between cells degrading the performance of detection in synchronized networks.

The pairing of DMRS-based sounding with normal DMRS is due to LTE/LTE-advanced DMRS properties: orthogonal DMRS multiplexing based on cyclic shifts requires alignment of corresponding PRB allocations. This means that DMRS-based sounding causes PUSCH scheduling limitations if DMRS-based sounding is semi-statically configured via higher layer RRC signalling. In LTE Rel-10, an orthogonal cover code was introduced to relax the same multiplexing limitation with MU-MIMO. If the other OC-code is reserved for DMRS-based sounding, MU-MIMO scheduling flexibility is correspondingly reduced. A feasible option for DMRS-based sounding seems to be aperiodic sounding, where the sounding is PDCCH-triggered where one of the few preconfigured sounding options fits to the DMRS resources left unused after PUSCH scheduling. Such an opportunity based operation reduces the benefits of DMRS based sounding to be rather marginal.

None of the earlier suggested solutions related to DMRS based sounding deal with inter-cell interference problem of DMRS based sounding. For example, a pilot scheme has been presented the one reference signal sequence to be used for both demodulation/detection and channel sounding. One pilot scheme for LTE uplink MIMO involves an antenna-specific solution in which orthogonal pilots are transmitted from multiple antennas respectively in TDM, CDM or FDM fashion. For example, with TDM fashion, the antenna-specific pilots are transmitted from different antennas in different sub-frames. The antenna-specific pilot is mainly used for beam selection. Another pilot scheme involves a beam-specific pilot in which only one pilot is transmitted by using the same beam as data transmission. Both antenna-specific and beam-specific pilots are transmitted in one UL sub-frame, by using some kind of multiplexing methods. A configurable RS strategy has also been presented, where non-pre-coded DMRS used to support PMI selection at eNB, is dynamically selected instead of pre-coded DMRS. This solution may be used to meet the SRS challenges related to SU-MIMO. Also a DMRS structure has been presented, which allows orthogonal DMRS multiplexing without any limitations on PRB allocation. This does not take sounding into consideration, but it allows DMRS multiplexing with arbitrary PRB allocations, and meets the challenge regarding the orthogonal multiplexing between sounding-DMRS and "normal" DMRS. Hence, it makes DMRS-based sounding an attractive solution for future LTE releases.

Figure 1:
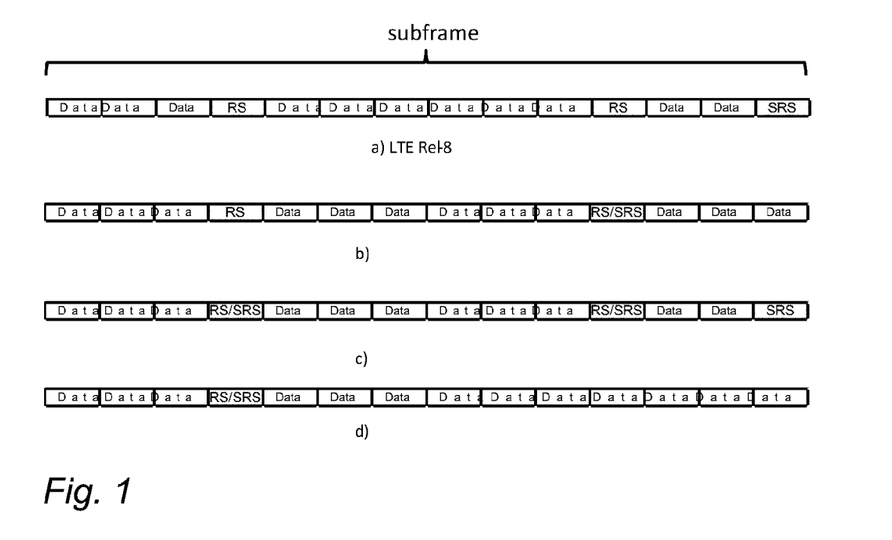
FIG. 1 illustrates exemplary sub-frame structures.

Referring to FIG. 1, item a) of FIG. 1 illustrates a sub-frame structure with a normal cyclic prefix length when using an existing DMRS/SRS arrangement. Items (b), (c), (d) of FIG. 1 illustrate a sub-frame structure when using a DMRS/SRS arrangement according to an exemplary embodiment. An exemplary embodiment involves code division multiplexing (CDM) between SRS and DMRS, which minimizes overhead of SRS in the terms of inter-cell interference and frequency-time resources used for sounding. In order to minimize overhead, an exemplary embodiment allows transmitting DMRS and SRS in the same time domain resource as shown in FIG. 1. In an exemplary embodiment, UE uses one reference signal sequence for both demodulation/detection of data channel and channel sounding such that the sequence part used for demodulation/detection is in a power offset compared to the sequence part used for channel sounding. The lowered power on the SRS part results in significantly lowered inter-cell interference but still allows a sufficient quality for FDPS and pre-coder selection. The sufficient power of the DMRS part ensures a channel estimation quality that is sufficient for demodulation and detection. In an exemplary embodiment, CDM is applied on a reference signal sequence by means of a cyclic shift of a whole length of the sequence. The cyclic shifts may be selected such that the sequences allocated to different UEs are orthogonal over a minimum allocation granularity of a data channel. An orthogonal cover code may be applied over reference signal sequences. Orthogonal resources may be allocated to adjacent cells or COMP clusters in order to alleviate inter-cell interference. In an exemplary embodiment, UL sounding may be based solely on a proposed combination of SRS and DMRS as shown in item b) of FIG. 1, where one or more symbols may be used for the combined SRS and DMRS (only one RS symbols has been used for combined SRS and DMRS in item b) of FIG. 1). In another exemplary embodiment, UL sounding may be based on both an SRS symbol and a combination of SRS and DMRS, as depicted in item c) of FIG. 1. In yet another exemplary embodiment, both UL sounding and SRS are based solely on a single symbol combination of SRS and DMRS, as depicted in item d) of FIG. 1.

Figure 2:
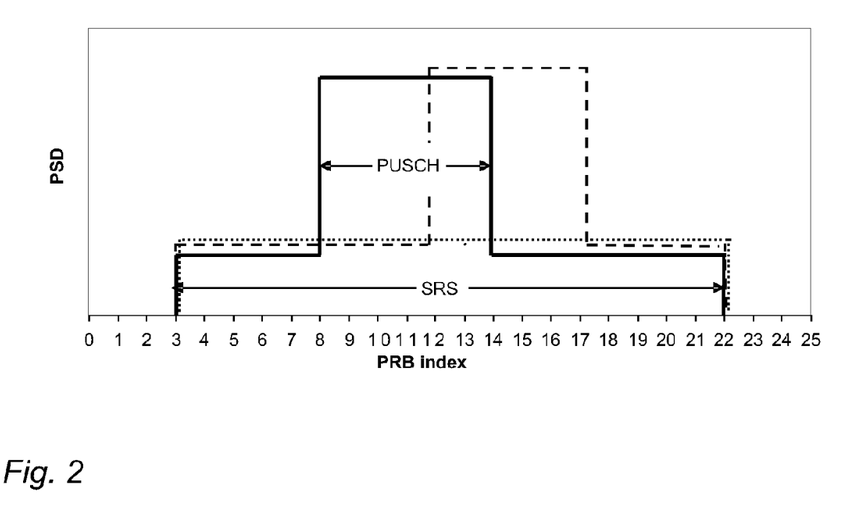
FIG. 2 illustrates exemplary multiplexing configuration.

FIG. 2 illustrates a UL SRS/DM multiplexing configuration according to an exemplary embodiment. Referring to FIG. 2, y-axis represents power spectral density, and x-axis represents frequency consisting of physical resource blocks. FIG. 2 illustrates multiplexing where a first user terminal UE1 (solid line) is transmitting both DMRS and SRS, a second user terminal UE2 (dashed line) is transmitting both DMRS and SRS (DMRS is partially overlapping with UE1), and a third user terminal UE3 (dot line) is transmitting SRS only. In an exemplary embodiment, eNB is configured to define and signal parameters needed for the multiplexing, wherein an UE transmitter and eNB receiver are able to apply them.

Regarding SRS configuration, sounding may be configured in a normal fashion via higher layer RRC signalling. SRS configuration may be periodic with a configurable period or aperiodic. This means that UE may transmit only SRS signal on the DMRS resources, only DMRS, or a combined SRS-DMRS as discussed above/below. Orthogonal multiplexing between different reference signals may be achieved e.g. by resorting to a DMRS structure discussed above. The RS cyclic shift used for combined SRS-DMRS transmission may be predetermined to follow the SRS cyclic shift configuration or PUSCH DMRS cyclic shift configuration. It may also be so that some of SRSs configured to UE follow SRS cyclic shift configuration (e.g. periodic SRS), while others follow PUSCH DMRS cyclic shift configuration (e.g. some of the aperiodic SRSs). DMRS based sounding may increase interference levels on the DMRS blocks. However, power setting according to an exemplary embodiment minimizes the increase on interference. Further, the impact on DMRS is well compensated for by a reduced overhead of time multiplexed SRS.

Regarding rules for SRS power control and dropping, power control set for PUSCH and SRS may be mostly followed (in other words, according to an exemplary embodiment, power control may be configured independently for DMRS and SRS portions). This means that SC-FDMA symbols comprising a combined DMRS-SRS, are transmitted at a higher power than other SC-FDMA symbols. However, certain additional rules may be needed. If the power of combined DMRS-SRS symbol exceeds a maximum transmission power, the SRS part of the reference signal is dropped. Alternatively, UE may autonomously reduce the transmission power used for the SRS part so that the maximum transmission power is not exceeded (this may require, for example, if happened in eNB, comparing a reference signal power step on DMRS-SRS border to an expected value). The reduction may be defined by means of a relationship between UE total configured maximum output power and instantaneous transmission power of DMRS and SRS portions according to a following equation:

$$\hat{P}_{SRS}(i) \leq (\hat{P}_{CMAX} - \hat{P}_{DMRS}(i))$$

where i is a symbol index, $\hat{P}_{CMAX}$ is a linear value of the UE total configured maximum output power, $\hat{P}_{DMRS}$ is a linear value of the DMRS portion, and $\hat{P}_{SRS}$, is a linear value of the SRS portion, respectively. The maximum transmission power threshold used above may be modified by an additional offset. This offset may be used to take into account a CM increase due to the DMRS-SRS combining. Offset may be predetermined based on standards or configured by higher layer signalling. It may also be specific for each PUSCH modulation order. If DMRS and SRS allocations do not overlap in frequency, SRS may be dropped. In another exemplary embodiment, parallel transmission of DMRS and SRS is allowed.

The joint DMRS and SRS sequence according to an exemplary embodiment enables minimizing SRS overhead, and maximizing sounding capacity. Thus, a good balance between tougher channel estimation requirements faced in demodulation and looser requirements sufficient for channel sounding may be provided, while minimizing unnecessary inter-cell interference due to sounding. An exemplary embodiment facilitates DMRS based sounding which offers a larger sounding capacity and enables an improved precoding gain with SU-MIMO gains, improved FDPS gains, improved COMP/MU-MIMO gains, an improved cell edge performance due to an improved coverage area of SRS, an improved throughput due to a reduced SRS overhead, and an increased flexibility in assigning SRS bandwidths.

An exemplary embodiment enables code division multiplexing between SRS and DMRS, minimizing overhead of SRS in the terms of inter-cell interference and frequency-time resources used for sounding. In order to minimize overhead, it is allowed to transmit DMRS and SRS in the same time (or frequency) domain resource. This is obtained such that UE uses one reference signal sequence for both demodulation/detection of a data channel and channel sounding such that the sequence part used for demodulation/detection is in a power offset compared to the sequence part used for channel sounding. Lowered power on the SRS part results in a significantly lowered inter-cell interference but still allows a sufficient quality for FDPS and pre-coder selection, and the sufficient power of DMRS part ensures a channel estimation quality that is sufficient for demodulation and detection.

Exemplary embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support sounding reference signal transmission. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE (long term evolution) network elements, without restricting the embodiment to such an architecture, however. The embodiments described in these examples are not limited to the LTE radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

Figure 3:
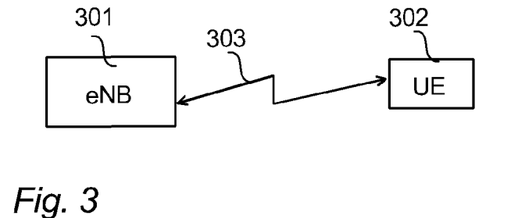
FIG. 3 shows a simplified block diagram illustrating exemplary system architecture.

A general architecture of a communication system is illustrated in FIG. 3. FIG. 3 is a simplified system architecture only showing some elements and functional entities, all being logical units whose implementation may differ from what is shown. The connections shown in FIG. 3 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

The exemplary radio system of FIG. 3 comprises a network node 301 of a network operator. The network node 301 may include e.g. an LTE base station (eNB), radio network controller (RNC), mobile switching centre (MSC), MSC server (MSS), mobility management entity (MME), gateway GPRS support node (GGSN), serving GPRS support node (SGSN), home location register (HLR), home subscriber server (HSS), visitor location register (VLR), or any other network element, or a combination of network elements. The network node 301 may be connected to one or more further network elements via an interface (not shown in FIG. 3). In FIG. 3, the radio network node 301 that may also be called eNB (enhanced node-B, evolved node-B) of the radio system hosts the functions for radio resource management in a public land mobile network. FIG. 3 shows one or more user equipment 302 located in the service area of the radio network node 301. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 3, the user equipment 302 is capable of connecting to the radio network node 301 via a connection 303.

Figure 4:
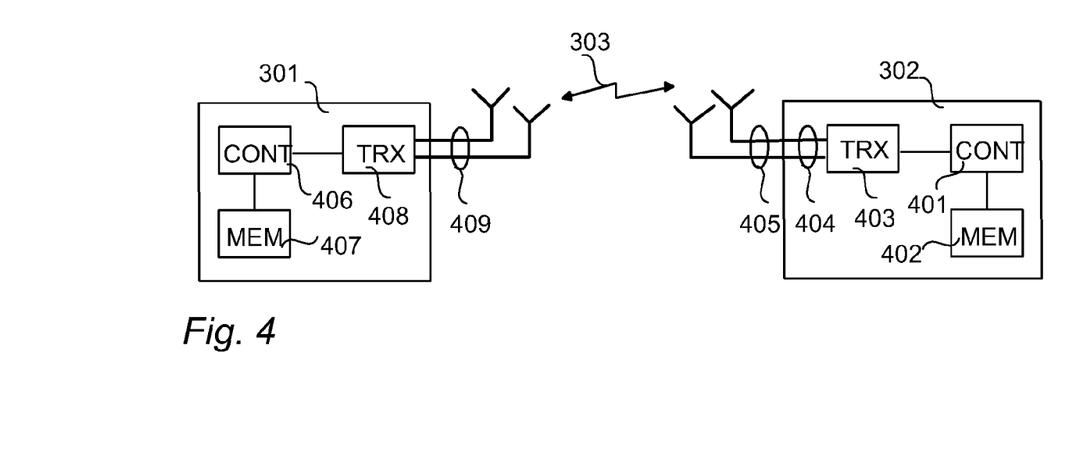
FIG. 4 shows a simplified block diagram illustrating exemplary apparatuses.

FIG. 4 is a block diagram of an apparatus according to an embodiment of the invention. FIG. 3 shows a user equipment 302 located in the area of a radio network node 301. The user equipment 302 is configured to be in connection with the radio network node 301. The user equipment or UE 302 comprises a controller 401 operationally connected to a memory 402 and a transceiver 403. The controller 401 controls the operation of the user equipment 302. The memory 402 is configured to store software and data. The transceiver 403 is configured to set up and maintain a wireless connection 303 to the radio network node 301. The transceiver is operationally connected to a set of antenna ports 404 connected to an antenna arrangement 405. The antenna arrangement 405 may comprise a set of antennas. The number of antennas may be one to four, for example. The number of antennas is not limited to any particular number. The user equipment 302 may also comprise various other components, such as a user interface, camera, and media player. They are not displayed in the figure due to simplicity. The radio network node 301, such as an LTE base station (eNode-B, eNB), comprises a controller 406 operationally connected to a memory 407, and a transceiver 408. The controller 406 controls the operation of the radio network node 301. The memory 407 is configured to store software and data. The transceiver 408 is configured to set up and maintain a wireless connection to the user equipment 302 within the service area of the radio network node 301. The transceiver 408 is operationally connected to an antenna arrangement 409. The antenna arrangement 409 may comprise a set of antennas. The number of antennas may be two to four, for example. The number of antennas is not limited to any particular number. The radio network node 301 may be operationally connected (directly or indirectly) to another network element (not shown in FIG. 4) of the communication system, such as a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 301, 302 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 301, 302 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 402, 407 may include volatile and/or non-volatile memory and typically stores content, data, or the like. For example, the memory 402, 407 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 5:
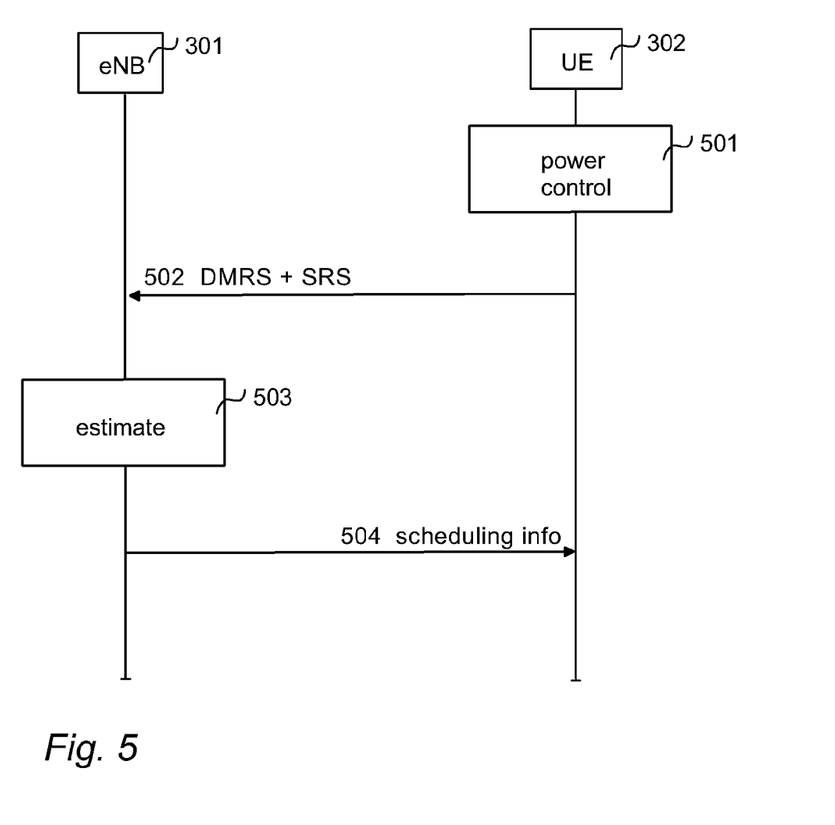
FIG. 5 shows a messaging diagram illustrating an exemplary messaging event according to an embodiment of the invention.

The signalling chart of FIG. 5 illustrates the required signalling. In the example of FIG. 5, a network node 302 (which may comprise e.g. a user terminal) transmits 502, to a network apparatus 301 (which may comprise e.g. an LTE-capable base station (eNode-B)), a demodulation reference signal DMRS and a sounding reference signal SRS in a same time (or frequency) domain resource. A single reference signal sequence may be used both for demodulation and detection of a data channel, and for channel sounding, such that a reference signal sequence part used for the demodulation and detection of the data channel is in a power offset compared to a reference signal sequence part used for the channel sounding. Demodulation reference signals DMRS and sounding reference signals SRS transmitted 502 from different user terminals 302 are received, in item 503, in the network apparatus 301, wherein code division multiplexing may be applied on a reference signal sequence by using a cyclic shift of a whole length of the reference signal sequence. The cyclic shift may be selected such that reference signal sequences to be allocated to the different user terminals are orthogonal over a minimum allocation granularity of the data channel. By estimating 503 the DMRS and SRS signals received in the base station 301, in item 503, the base station is able to decide 503 on the uplink frequency domain scheduling. In item 504, the base station 301 transmits to the user terminal(s) 302 information on the uplink frequency resources scheduled to the user terminal(s) 302. The user terminal 302 may be configured to control, in item 501, the transmission power of the user terminal 302, wherein if the transmission power of a combined DMRS-SRS symbol exceeds a maximum transmission power, the SRS part of the reference signal may be dropped. Alternatively, the user terminal 302 may be configured to autonomously reduce the transmission power used for the SRS part so that maximum transmission power is not exceeded.

Figure 6:
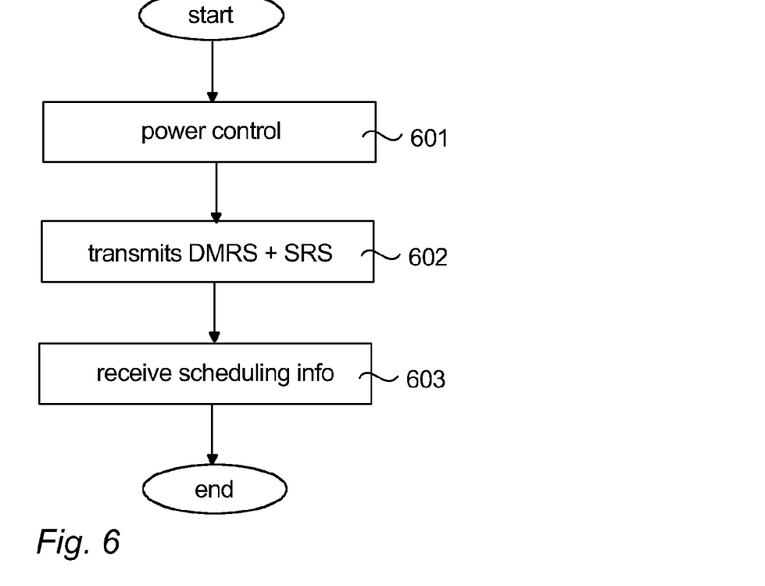
FIG. 6 shows a schematic diagram of a flow chart according to an exemplary embodiment of the invention.

FIG. 6 is a flow chart illustrating an exemplary embodiment. The apparatus 302, which may comprise e.g. a network element (network node, e.g. a user terminal, UE), transmits, in item 602, to a network apparatus 301 (which may comprise e.g. an LTE-capable base station (eNode-B)), a demodulation reference signal DMRS and a sounding reference signal SRS in a same time (or frequency) domain resource. A single reference signal sequence may be used both for demodulation and detection of a data channel, and for channel sounding, such that a reference signal sequence part used for the demodulation and detection of the data channel is in a power offset compared to a reference signal sequence part used for the channel sounding. In item 603, the user terminal 302 receives, from the base station 301, information on uplink frequency resources scheduled to the user terminal 302. The user terminal 302 may be configured to control, in item 601, the transmission power of the user terminal 302, wherein if the transmission power of a combined DMRS-SRS symbol exceeds a maximum transmission power, the SRS part of the reference signal may be dropped. Alternatively, the user terminal 302 may be configured to autonomously reduce the transmission power used for the SRS part, so that maximum transmission power is not exceeded.

Figure 7:
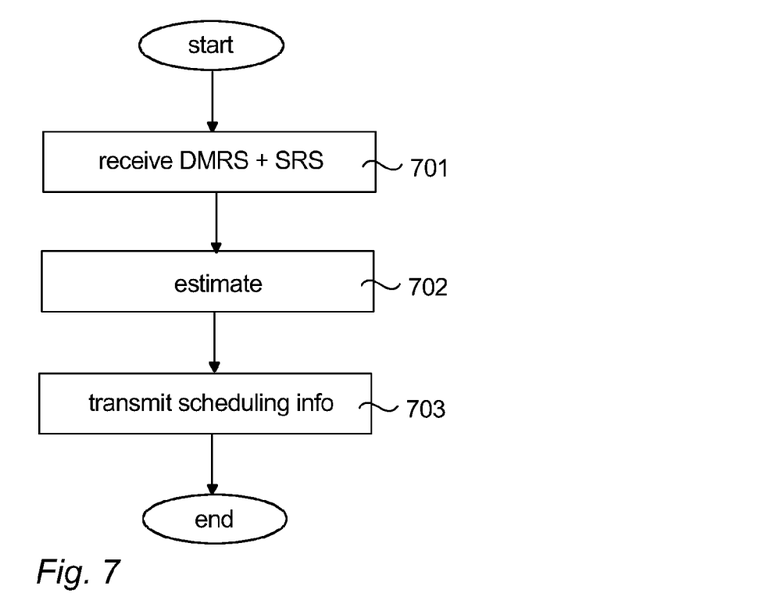
FIG. 7 shows a schematic diagram of a flow chart according to another exemplary embodiment of the invention.

FIG. 7 is a flow chart illustrating an exemplary embodiment. The apparatus 301, which may comprise e.g. a network element (network node, e.g. an LTE base station, eNode-B, eNB), receives, in item 701, a demodulation reference signal DMRS and a sounding reference signal SRS transmitted, from a user terminal 302, in a same time (or frequency) domain resource. A single reference signal sequence may be used both for demodulation and detection of a data channel, and for channel sounding, such that a reference signal sequence part used for the demodulation and detection of the data channel is in a power offset compared to a reference signal sequence part used for the channel sounding. Demodulation reference signals DMRS and sounding reference signals SRS transmitted 502 from different user terminals 302 are received, in item 702, in the network apparatus 301, wherein code division multiplexing may be applied on a reference signal sequence by using a cyclic shift of a whole length of the reference signal sequence. The cyclic shift is selected such that reference signal sequences to be allocated to the different user terminals are orthogonal over a minimum allocation granularity of the data channel. By estimating 702 the DMRS and SRS signals received in the base station 301, in item 702, the base station is able to decide 702 on the uplink frequency domain scheduling. In item 703, the base station 301 transmits to the user terminal(s) 302, information on the uplink frequency resources scheduled to the user terminal(s) 302.

In an exemplary embodiment, selection for multiplexing of DMRS or SRS may be carried out either by network configuration (e.g. RNC signalling) or by specific control signalling (e.g. a feedback control message). The network side may be configured to carry out this selection decision since a receiver should know beforehand which sequence is to be received. A demodulation reference signal DMRS of a first user terminal and a sounding reference signal SRS of a second user terminal, transmitted on a same time domain resource, may thus be separated by a utilizing code division multiple access methodology The steps/points, signalling messages and related functions de-scribed above in FIGS. 1 to 7 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The server operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method for reference signal transmission in a communications system, the method comprising transmitting, from a user terminal to a network apparatus, a demodulation reference signal DMRS and a sounding reference signal SRS in a same time domain resource, wherein a single reference signal sequence is used both for demodulation and detection of a data channel, and for channel sounding, such that a reference signal sequence part used for the demodulation and detection of the data channel is in a power offset compared to a reference signal sequence part used for the channel sounding.

According to another exemplary embodiment, there is provided a method for applying code division multiplexing on a reference signal sequence by using a cyclic shift of a whole length of the reference signal sequence.

According to yet another exemplary embodiment, cyclic shift is selected such that reference signal sequences to be allocated to the different user terminals are orthogonal over a minimum allocation granularity of the data channel.

According to yet another exemplary embodiment, there is provided a method for obtaining a lowered inter-cell interference by means of a lowered power on the reference signal sequence part used for the channel sounding compared to the reference signal sequence part used for the demodulation and detection, and maintaining a sufficient quality for frequency domain packet scheduler FDPS and pre-coder selection.

According to yet another exemplary embodiment, there is provided a method for maintaining a sufficient power of the reference signal sequence part used for the demodulation and detection in order to ensure a channel estimation quality that is sufficient for the demodulation and detection.

According to yet another exemplary embodiment, there is provided a method for separating a demodulation reference signal DMRS of a first user terminal and a sounding reference signal SRS of a second user terminal, transmitted on a same time domain resource, by a code division multiple access methodology.

According to yet another exemplary embodiment, there is provided a method for applying an orthogonal cover code over the reference signal sequences.

According to yet another exemplary embodiment, there is provided a method for allocating orthogonal resources to adjacent cells and/or collaborated multipoint COMP clusters in order to alleviate inter-cell interference.

According to yet another exemplary embodiment, uplink channel sounding is based on a combination of SRS and DMRS, wherein one or more reference signal RS symbols are used for the combination of SRS and DMRS.

According to yet another exemplary embodiment, the uplink channel sounding is based on an SRS symbol and a combination of SRS and DMRS.

According to yet another exemplary embodiment, there is provided a method for the uplink channel sounding and SRS are based on a single symbol combination of SRS and DMRS.

According to yet another exemplary embodiment, power offset is determined by separate power controlling applied separately for DMRS and SRS.

According to yet another exemplary embodiment, if the power of a combined DMRS SRS symbol exceeds a maximum transmission power, the reference signal sequence part used for the channel sounding is dropped.

According to yet another exemplary embodiment, if the power of a combined DMRS SRS symbol exceeds a maximum transmission power, the transmission power used for the reference signal sequence part used for the channel sounding is autonomously reduced in the user terminal, wherein transmission power reduction is defined by means of a relationship between a total configured maximum output power of the user terminal and an instantaneous transmission power of DMRS and SRS parts according to a following equation:

$$\hat{P}_{SRS}(i) \leq (\hat{P}_{CMAX} - \hat{P}_{DMRS}(i))$$

where i is a symbol index, $\hat{P}_{CMAX}$ is a linear value of the total configured maximum output power of the user terminal (302), $\hat{P}_{DMRS}$ is the linear value of a DMRS part, and $\hat{P}_{SRS}$ is the linear value of an SRS part, respectively.

According to yet another exemplary embodiment, there is provided an apparatus comprising at least one processor; and at least one memory including a computer program code configured to, with the at least one processor, cause the apparatus to transmit, to a radio network node, a demodulation reference signal DMRS and a sounding reference signal SRS in a same time domain resource, wherein a single reference signal sequence is used both for demodulation and detection of a data channel, and for channel sounding, such that a reference signal sequence part used for the demodulation and detection of the data channel is in a power offset compared to a reference signal sequence part used for the channel sounding.

According to yet another exemplary embodiment, the at least one memory and the computer program code are configured to, with the at least one processor, cause the apparatus to obtain a lowered inter-cell interference by means of a lowered power on the reference signal sequence part used for the channel sounding compared to the reference signal sequence part used for the demodulation and detection, and maintain a sufficient quality for frequency domain packet scheduler FDPS and pre-coder selection.

According to yet another exemplary embodiment, the at least one memory and the computer program code are configured to, with the at least one processor, cause the apparatus to maintain a sufficient power of the reference signal sequence part used for the demodulation and detection in order to ensure a channel estimation quality that is sufficient for the demodulation and detection.

According to yet another exemplary embodiment, the at least one memory and the computer program code are configured to, with the at least one processor, cause the apparatus to separate a demodulation reference signal DMRS of a first user terminal and a sounding reference signal SRS of a second user terminal, transmitted on a same time domain resource, by a code division multiple access methodology.

According to yet another exemplary embodiment, the at least one memory and the computer program code are configured to, with the at least one processor, cause the apparatus to apply an orthogonal cover code over the reference signal sequences, wherein an increased amount of demodulation reference signal DMRS and sounding reference signal SRS resources is obtained.

According to yet another exemplary embodiment, the at least one memory and the computer program code are configured to, with the at least one processor, cause the apparatus to apply uplink channel sounding based on a combination of SRS and DMRS, wherein one or more reference signal RS symbols are used for the combination of SRS and DMRS.

According to yet another exemplary embodiment, the at least one memory and the computer program code are configured to, with the at least one processor, cause the apparatus to apply uplink channel sounding based on an SRS symbol and a combination of SRS and DMRS.

According to yet another exemplary embodiment, the at least one memory and the computer program code are configured to, with the at least one processor, cause the apparatus to apply uplink channel sounding and SRS based on a single symbol combination of SRS and DMRS.

According to yet another exemplary embodiment, the at least one memory and the computer program code are configured to, with the at least one processor, cause the apparatus to determine the power offset by separate power controlling applied separately for DMRS and SRS.

According to yet another exemplary embodiment, the at least one memory and the computer program code are configured to, with the at least one processor, cause the apparatus to drop the reference signal sequence part used for the channel sounding, if the power of a combined DMRS-SRS symbol exceeds a maximum transmission power.

According to yet another exemplary embodiment, the at least one memory and the computer program code are configured to, with the at least one processor, cause the apparatus to, if the power of a combined DMRS-SRS symbol exceeds a maximum transmission power, autonomously reduce the transmission power used for the reference signal sequence part used for the channel sounding, wherein transmission power reduction is defined by means of a relationship between a total configured maximum output power of the user terminal and an instantaneous transmission power of DMRS and SRS parts according to a following equation:

$$\hat{P}_{SRS}(i) \leq (\hat{P}_{CMAX} - \hat{P}_{DMRS}(i))$$

where i is a symbol index, $\hat{P}_{CMAX}$ is a linear value of the total configured maximum output power of the user terminal (302), $\hat{P}_{DMRS}$ is the linear value of a DMRS part, and $\hat{P}_{SRS}$ is the linear value of an SRS part, respectively.

According to yet another exemplary embodiment, there is provided an apparatus comprising at least one processor; and at least one memory including a computer program code configured to, with the at least one processor, cause the apparatus to receive, from a user terminal (302), a demodulation reference signal DMRS and a sounding reference signal SRS in a same time domain resource, wherein a single reference signal sequence is used both for demodulation and detection of a data channel, and for channel sounding, such that a reference signal sequence part used for the demodulation and detection of the data channel is in a power offset compared to a reference signal sequence part used for the channel sounding.

According to yet another exemplary embodiment, the at least one memory and the computer program code are configured to, with the at least one processor, cause the apparatus to provide code division multiplexing parameters defined for multiplexing between the demodulation reference signal DMRS and the sounding reference signal SRS, wherein a demodulation reference signal DMRS of a first user terminal and a sounding reference signal SRS of a second user terminal, transmitted on a same time domain resource, are separated by a code division multiple access methodology.

According to yet another exemplary embodiment, the at least one memory and the computer program code are configured to, with the at least one processor, cause the apparatus to apply an orthogonal cover code over the reference signal sequences, wherein an increased amount of demodulation reference signal DMRS and sounding reference signal SRS resources is obtained.

According to yet another exemplary embodiment, the at least one memory and the computer program code are configured to, with the at least one processor, cause the apparatus to allocate orthogonal resources to adjacent cells and/or collaborated multipoint COMP clusters in order to alleviate inter-cell interference.

According to yet another exemplary embodiment, a computer program product comprises program code means adapted to perform any one of the method steps when the program is run on a computer.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP 3rd generation partnership project
AMC adaptive modulation and coding
BW bandwidth
CDM code division multiplexing
CM cubic metric
COMP collaborated multipoint
CS cyclic shift
DL downlink
DMRS demodulation reference signal
FDPS frequency domain packet scheduler
LTE long term evolution
LTE-A LTE-advanced
MIMO multiple-input multiple-output
MU-MIMO multi-user MIMO
OC orthogonal cover
PAPR peak-to-average power ratio
PDCCH physical downlink control channel
PMI pre-coding matrix indicator
PRB physical resource block
PUCCH physical uplink control channel
PUSCH physical uplink shared channel
RAN radio access network
RRC radio resource control
RS reference signal
SRS sounding reference signal
SU-MIMO single-user MIMO
TR technical report
UE user equipment
UL uplink
UTRA universal terrestrial radio access
PHY physical

The invention claimed is:
1. A method for reference signal transmission in a communications system, the method comprising:
    transmitting, from a user terminal to a network apparatus in a single time domain resource, a single reference signal sequence including a demodulation reference signal (DMRS) which is useable at the network apparatus for demodulation and detection of a data channel and a sounding reference signal (SRS) for channel sounding, wherein a first frequency part of the single reference signal sequence is usable for the DMRS, and a rest of the single reference signal sequence is useable for the SRS, wherein the first frequency part is in a power offset as compared to the rest of the single reference signal sequence.

2. A method according to claim 1 and further comprising: applying code division multiplexing on the single reference signal sequence by using a cyclic shift of a whole length of the single reference signal sequence.

3. A method according to claim 1 wherein a cyclic shift is selected such that reference signal sequences to be allocated to the different user terminals are orthogonal over a minimum allocation granularity of the data channel.

4. A method according to claim 1 and further comprising obtaining a lowered inter-cell interference by using a lowered power on the reference signal sequence part used for the channel sounding compared to the reference signal sequence part used for the demodulation and detection, and maintaining a sufficient quality for frequency domain packet scheduler (FDPS) and pre-coder selection.

5. A method according to claim 1 and further comprising: maintaining a sufficient power of the single reference signal sequence part used for the demodulation and detection in order to ensure a channel estimation quality that is sufficient for the demodulation and detection.

6. A method according to claim 1 and further comprising: separating a demodulation reference signal (DMRS) of a first user terminal and a sounding reference signal (SRS) of a second user terminal, transmitted on a same time domain resource, by a code division multiple access methodology.

7. A method according to claim 1 and further comprising applying an orthogonal cover code over the single reference signal sequence.

8. A method according to claim 1 and further comprising: allocating orthogonal resources to adjacent cells or collaborated multipoint clusters in order to decrease inter-cell interference.

9. A method according to claim 1 wherein uplink channel sounding is based on a combination of SRS and DMRS, wherein one or more reference signal (RS) symbols are used for the combination of SRS and DMRS.

10. A method according to claim 1 wherein uplink channel sounding is based on an SRS symbol and a combination of SRS and DMRS.

11. A method according to claim 1 wherein uplink channel sounding and SRS are based on a single symbol combination of SRS and DMRS.

12. A method according to claim 1 wherein the power offset is determined by separate power controlling applied separately for DMRS and SRS.

13. A method according to claim 1 wherein if the power of a combined DMRS-SRS symbol exceeds a maximum transmission power, the reference signal sequence part used for the channel sounding is dropped.

14. A method according to claim 1 wherein if the power of a combined DMRS-SRS symbol exceeds a maximum transmission power, the transmission power used for the single reference signal sequence part used for the channel sounding is autonomously reduced in the user terminal, wherein transmission power reduction is defined by means of a relationship between a total configured maximum output power of the user terminal and an instantaneous transmission power of DMRS and SRS parts according to a following equation:

$$\hat{P}_{SRS}(i) \leq (\hat{P}_{CMAX} - \hat{P}_{DMRS}(i))$$

where i is a symbol index, $\hat{P}_{CMAX}$ is a linear value of the total configured maximum output power of the user terminal, $\hat{P}_{DMRS}$ is the linear value of a DMRS part, and $\hat{P}_{SRS}$ is the linear value of an SRS part, respectively.

15. An apparatus comprising:
at least one processor; and
at least one memory including a computer program code, wherein the at least one memory and the computer program code are configured to, with the at least one processor, cause the apparatus to:
transmit, to a radio network node in a single time domain resource, a single reference signal sequence including a demodulation reference signal (DMRS) which is useable at the radio network node for demodulation and detection of a data channel and a sounding reference signal (SRS) for channel sounding, wherein a first frequency part of the single reference signal sequence is useable for the DMRS, and a rest of the single reference signal sequence is useable for the SRS,
wherein the first frequency part is in a power offset as compared to the rest of the single reference signal sequence.

16. An apparatus as claimed in claim 15, wherein code division multiplexing is applied on the single reference signal sequence by using a cyclic shift of a whole length of the single reference signal sequence.

17. An apparatus as claimed in claim 15 wherein a cyclic shift is selected such that reference signal sequences to be allocated to the different user terminals are orthogonal over a minimum allocation granularity of the data channel.

18. An apparatus as claimed in claim 15 wherein the at least one memory and the computer program code are configured to, with the at least one processor, cause the apparatus to:
obtain a lowered inter-cell interference by using a lowered power on the reference signal sequence part used for the channel sounding compared to the reference signal sequence part used for the demodulation and detection, and maintain a sufficient quality for frequency domain packet scheduler (FDPS) and pre-coder selection.

19. An apparatus as claimed in claim 15, wherein the at least one memory and the computer program code are configured to, with the at least one processor, cause the apparatus to:
maintain a sufficient power of the single reference signal sequence part used for the demodulation and detection in order to ensure a channel estimation quality that is sufficient for the demodulation and detection.

20. An apparatus as claimed in claim 15, wherein the at least one memory and the computer program code are configured to, with the at least one processor, cause the apparatus to:
separate a demodulation reference signal (DMRS) of a first user terminal and a sounding reference signal (SRS) of a second user terminal, transmitted on a same time domain resource, by a code division multiple access methodology.

21. An apparatus as claimed in claim 15, wherein the at least one memory and the computer program code are configured to, with the at least one processor, cause the apparatus to:

apply an orthogonal cover code over the single reference signal sequence, wherein an increased amount of demodulation reference signal (DMRS) and sounding reference signal (SRS) resources is obtained.

22. An apparatus as claimed in claim 15, wherein the at least one memory and the computer program code are configured to, with the at least one processor, cause the apparatus to:
apply uplink channel sounding based on a combination of SRS and DMRS, wherein one or more reference signal (RS) symbols are used for the combination of SRS and DMRS.

23. An apparatus as claimed in claim 15, wherein the at least one memory and the computer program code are configured to, with the at least one processor, cause the apparatus to:
apply uplink channel sounding based on an SRS symbol and a combination of SRS and DMRS.

24. An apparatus as claimed in claim 15, wherein the at least one memory and the computer program code are configured to, with the at least one processor, cause the apparatus to:
apply uplink channel sounding and SRS based on a single symbol combination of SRS and DMRS.

25. An apparatus as claimed in claim 15, wherein the at least one memory and the computer program code are configured to, with the at least one processor, cause the apparatus to:
determine the power offset by separate power controlling applied separately for DMRS and SRS.

26. An apparatus as claimed in claim 15, wherein the at least one memory and the computer program code are configured to, with the at least one processor, cause the apparatus to:
drop the reference signal sequence part used for the channel sounding, if the power of a combined DMRS-SRS symbol exceeds a maximum transmission power.

27. An apparatus as claimed in claim 15, wherein the at least one memory and the computer program code are configured to, with the at least one processor, cause the apparatus to, if the power of a combined DMRS-SRS symbol exceeds a maximum transmission power, autonomously reduce the transmission power used for the single reference signal sequence part used for the channel sounding, wherein transmission power reduction is defined by means of a relationship between a total configured maximum output power of the user terminal and an instantaneous transmission power of DMRS and SRS parts according to a following equation:

$$\hat{P}_{SRS}(i) \leq (\hat{P}_{CMAX} - \hat{P}_{DMRS}(i))$$

where i is a symbol index, $\hat{P}_{CMAX}$ is a linear value of the total configured maximum output power of the user terminal, $\hat{P}_{DMRS}$ is the linear value of a DMRS part, and $\hat{P}_{SRS}$ is the linear value of an SRS part, respectively.

28. An apparatus comprising
at least one processor; and
at least one memory including a computer program code, wherein the at least one memory and the computer program code are configured to, with the at least one processor, cause the apparatus to:
receive, from a user terminal in a single time domain resource, a single reference signal sequence including a demodulation reference signal (DMRS) which is useable by the apparatus for demodulation and detection of a data channel and a sounding reference signal (SRS) for channel sounding, wherein a first frequency part of the single reference signal sequence is useable for the DMRS, and a rest of the single reference signal sequence is useable for the SRS,
wherein the first frequency part is in a power offset as compared to the rest of the single reference signal sequence.

29. An apparatus as claimed in claim 28, wherein code division multiplexing is applied on the single reference signal sequence by using a cyclic shift of a whole length of the single reference signal sequence.

30. An apparatus as claimed in claim 29, wherein a cyclic shift is selected such that reference signal sequences to be allocated to the different user terminals are orthogonal over a minimum allocation granularity of the data channel.

31. An apparatus as claimed in claim 28, wherein the at least one memory and the computer program code are configured to, with the at least one processor, cause the apparatus to:
provide code division multiplexing parameters defined for multiplexing between the demodulation reference signal (DMRS) and the sounding reference signal (SRS), wherein a demodulation reference signal (DMRS) of a first user terminal and a sounding reference signal (SRS) of a second user terminal, transmitted on a same time domain resource, are separated by a code division multiple access methodology.

32. An apparatus as claimed in claim 28, wherein the at least one memory and the computer program code are configured to, with the at least one processor, cause the apparatus to:
apply an orthogonal cover code over the single reference signal sequence, wherein an increased amount of demodulation reference signal (DMRS) and sounding reference signal (SRS) resources is obtained.

33. An apparatus as claimed in claim 28, wherein the at least one memory and the computer program code are configured to, with the at least one processor, cause the apparatus to:
allocate orthogonal resources to adjacent cells or collaborated multipoint COMP clusters in order to decrease inter-cell interference.

34. An apparatus as claimed in claim 28, wherein uplink channel sounding is based on a combination of SRS and DMRS, wherein one or more reference signal (RS) symbols are used for the combination of SRS and DMRS.

35. An apparatus as claimed in claim 28, wherein uplink channel sounding is based on an SRS symbol and a combination of SRS and DMRS.

36. An apparatus as claimed in claim 28, wherein uplink channel sounding and SRS are based on a single symbol combination of SRS and DMRS.

* * * * *

UNITED STATES PATENT AND TRADEMARK OFFICE
CERTIFICATE OF CORRECTION

| | | |
|---|---|---|
| PATENT NO. | : 9,706,533 B2 | Page 1 of 1 |
| APPLICATION NO. | : 14/377360 | |
| DATED | : July 11, 2017 | |
| INVENTOR(S) | : Pajukoski et al. | |

It is certified that error appears in the above-identified patent and that said Letters Patent is hereby corrected as shown below:

In the Claims

In Column 16, Line 33, Claim 17, delete "claim 15" and insert -- claim 15, --, therefor.

In Column 16, Line 37, Claim 18, delete "claim 15" and insert -- claim 15, --, therefor.

In Column 17, Line 57, Claim 28, delete "comprising" and insert -- comprising: --, therefor.

Signed and Sealed this
Seventeenth Day of October, 2017

Joseph Matal
*Performing the Functions and Duties of the
Under Secretary of Commerce for Intellectual Property and
Director of the United States Patent and Trademark Office*